Feb. 20, 1973 B. E. BRILEY 3,717,755

PARALLEL ADDER USING A CARRY PROPAGATION BUS

Filed May 21, 1971 2 Sheets-Sheet 1

INVENTOR
B. E. BRILEY
BY Norman D. McClaskey
ATTORNEY

3,717,755
PARALLEL ADDER USING A CARRY PROPAGATION BUS

Bruce Edwin Briley, Countryside, Ill., assignor to Bell Telephone Laboratories, Incorporated, Murray Hill and Berkeley Heights, N.J.

Filed May 21, 1971, Ser. No. 145,696
Int. Cl. G06f 7/50, 7/385
U.S. Cl. 235—175 7 Claims

ABSTRACT OF THE DISCLOSURE

A parallel adder is implemented using low loss, diode switches in the carry propagation bus of the multistage adder. One switch is associated with an adder stage and each switch presents a shunt impedance to the carry propagation bus that is a function of the numerical significance of the adder stage with which it is associated.

BACKGROUND OF THE INVENTION

(1) Field of the invention

This invention relates to the field of parallel adders and, more particularly, to parallel adders which employ carry propagation buses.

(2) Description of the prior art

Various techniques have been devised to increase the operating speed of parallel adders. Among them is the carry propagation bus technique in which each stage of the adder decides, independently of the other stages, whether a carry it receives is to be passed on to the next stage or, alternatively, if it must generate a carry signal within itself. An example of a prior art, binary adder using the propagation bus technique is shown in FIG. 2. Referring to the adder stage 202, the inputs $a_1$ and $b_1$ are the coefficients of the first power of two in the augend and addend, respectively. The modulo-2 adder 102 adds these two inputs and the carry signal on line 122 and produces the sum output $S_1$. These inputs, $a_1$ and $b_1$, also drive the AND gate 131 and the exclusive OR gate 106 which control the carry operations of the adder stage 202. In particular, when the output 118 of the AND gate 131 is equal to "1," indicating that both of the inputs $a_1$ and $b_1$ are equal to "1," a carry is generated within the adder stage 202 which is propagated to the next adder stage. The output 118 is applied to the OR gate 114 and results in the enabling of the gate. Enabling the gate 114 results in the appearance of a carry signal on line 123. The previously mentioned exclusive OR gate 106 determines whether a carry received on line 122 is to be terminated within the adder stage 202 or supplied to line 123 by the OR gate 114 for propagation to the next adder stage. More specifically, if the output 128 of the exclusive OR gate 106 is equal to "1," indicating that the two inputs $a_1$ and $b_1$ are in different logical states, the switch 110 is enabled to pass a carry signal on line 122 to the input of the OR gate 114. Since the output 128 of the exclusive OR gate 106 and the output 118 of the AND gate 131 cannot both be equal to "1" simultaneously, the switch 110 is never enabled when a carry is generated within the adder stage 202 by the AND gate 131.

By assembling several adder stages like the adder stage 202 and connecting the carry output of one to the carry input of another, a parallel adder is formed in which carries are propagated over a bus. This is illustrated in FIG. 2 by the typical connection of the adder stage 201 to the adder stage 202 via the line 122 from the output of the OR gate 113 to the carry input of the modulo-2 adder 102 and the input of the switch 110. If the switch 110 is enabled as a result of the dissimilarity of the augend and addend inputs to the adder stage 202 which causes the exclusive OR gate 106 to be enabled, the line 122 is electrically connected to the line 123, thereby forming a carry propagation bus for a carry from the adder stage 201 through the adder stage 202 to the next stage.

While the prior art adders which employ the carry propagation bus technique are capable of operating at high speeds, problems with carry signal degradation arise in a large adder when a carry must be propagated through many adder stages. The carry signal degradation is, in part, due to the voltage losses within the switches in the propagation bus and the signal loading effects of connecting many impedances in parallel on a signal bus driven by a nonzero source impedance. In attempting to minimize these losses, active amplifiers have been inserted in series with the propagation bus. While this is effective in minimizing the degradation of the carry signal, it also results in a reduction in operating speed for the adder. Such reduction in operating speed is undesirable since high operating speed is generally a major objective in parallel adders.

SUMMARY OF THE INVENTION

Applicant overcomes the carry signal degradation problems of prior art carry propagation bus adders by utilizing in each adder stage a fast activating, low loss switch that presents a shunt impedance to the propagation bus determined by the following general expression:

$$\text{Impedance}=ZK^j$$

where Z is an impedance and K is a constant and $j$ indicates the numerical significance of the adder stage in which the switch appears. In essence, the impedance presented by each switch between the propagation bus and ground is increased stage by stage in the direction of carry propagation in a manner called impedance tapering. When compared with results attainable using a single value of shunt impedance for all of these low loss switches, impedance tapering results in an increase in the driving point impedance of the carry propagation bus and a commensurate decrease in driving current requirements and power dissipation. Tapering also results in an increase in the ratio of input to source impedance at all points along the propagation bus and thus reduces the signal voltage loss due to the nonzero output impedance of driving source.

OBJECTS OF THE INVENTION

It is an object of the invention to minimize carry signal degradation while maintaining the operating speed of an N stage adder employing a carry propagation bus.

It is a more specific object of the invention to facilitate the transfer of carry information in an N stage, parallel adder employing a carry propagation bus by using simple, low loss and high speed switches in the carry propagation bus.

It is a still more specific object of the invention to provide a means for reducing the loss properties attendant to carry a propagation bus by selecting, according to a predetermined mathematical formula, the shunt impedance presented to the carry propagation bus by each switch in the carry propagation bus.

DESCRIPTION OF THE ILLUSTRATIVE EMBODIMENT

Figure 1:
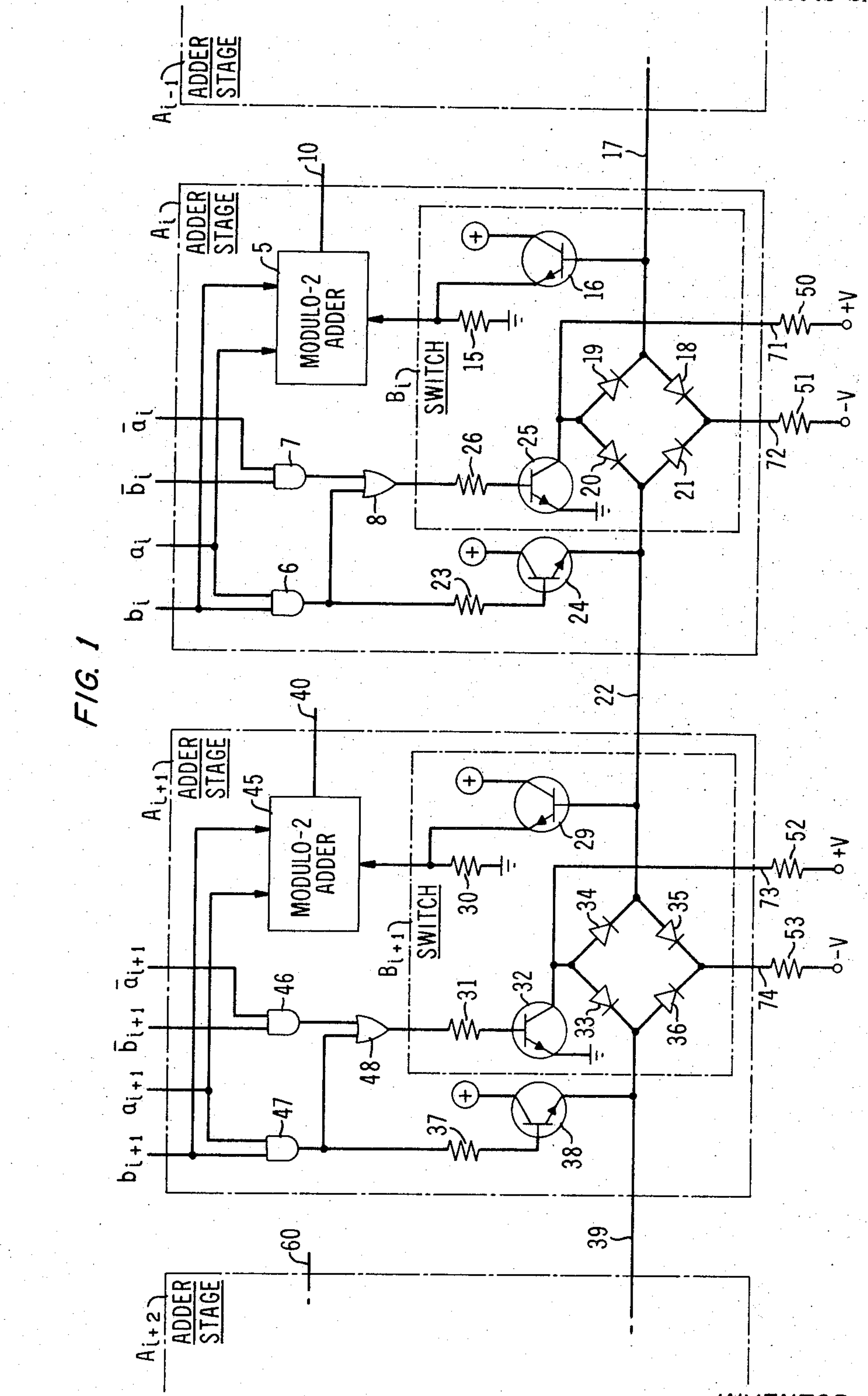
FIG. 1 shows four stages of a parallel, binary adder implementing the invention.
Figure 2:
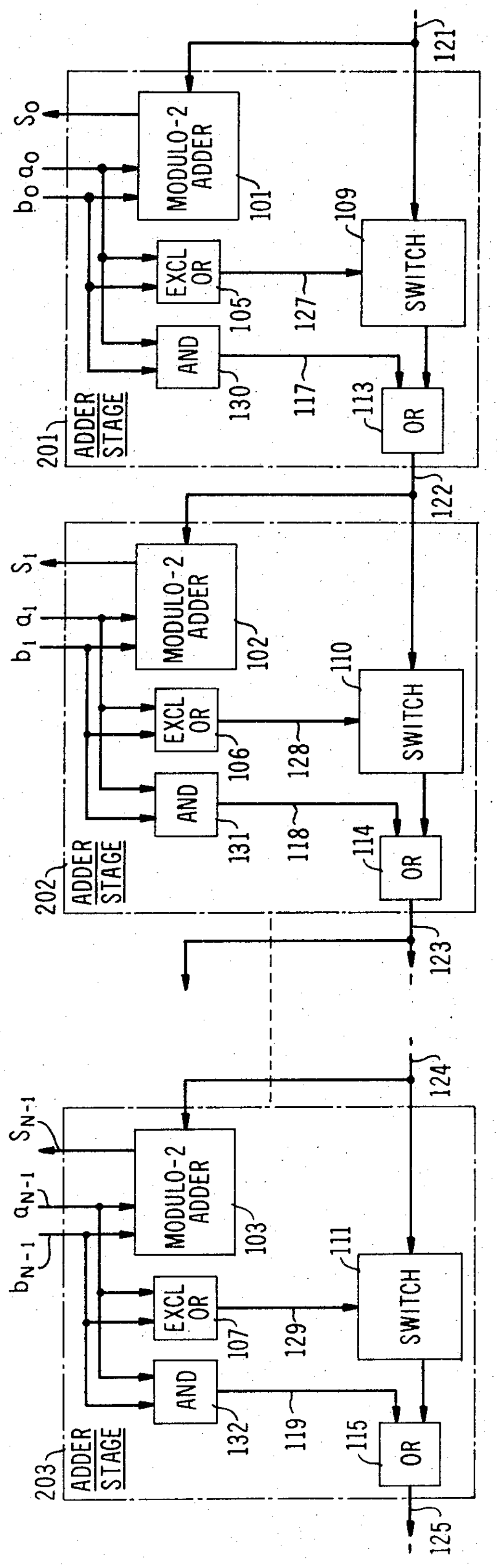
FIG. 2 PRIOR ART
FIG. 2 shows the general form of a prior art N stage, binary, parallel adder employing a carry propagation bus.

An illustrative embodiment of four stages, $A_{i-1}$ through $A_{i+2}$, of an N stage, parallel, binary adder incorporating applicant's invention is shown in FIG. 1. While the description of applicant's invention is limited to an illustrative binary adder for the purposes of brevity and clarity, it is clear that the invention is useful in any digital adder requiring signal propagation on a bus. It will become apparent that the principles of applicant's invention apply equally well to a digital adder designed to perform arithmetic operations in accordance with the requirements of any number system.

As previously mentioned, applicant's invention minimizes carry degradation by varying the shunt impedance presented to the carry propagation bus by each switch $B_j$ (FIG. 1) as a function of the numerical significance of the adder stage in which the switch is used. This variation in shunt impedance at each switch is called impedance tapering and may be expressed as a mathematical formula. Generally, the formula that represents a useful variation in switch shunt impedance may vary somewhat depending on the specific circuitry involved. However, it is possible to derive a general formula that will provide useful switch shunt impedance variation for a large number of adder designs.

Referring to FIG. 1, the numerical weight or significance of the adder stages shown increases from right to left. More specifically, the numerical significance of the adder stage $A_i$ is greater than the numerical significance of the adder stage $A_{i-1}$. Similarly, carry information is propagated between the adder stages from right to left. For purposes of discussion, the stages in a parallel adder such as those shown in FIG. 1 are assigned an identification index represented by the integer variable $j$ which takes on the value zero for the least significant stage and increases with the increasing numerical significance of each stage. In essence, $j$ takes on the values 0 through N−1 as it is used to identify the various adder stages $A_0$ through $A_{N-1}$, respectively, in an N stage adder. It is this variable $j$ which is used to relate the aforementioned shunt impedance of a switch to the numerical significance of the adder in which it is used.

Referring specifically to the adder stage $A_i$ for which the variable $j$ takes on the value $i$, the resistors 50 and 51 supply control current to the switch $B_i$ and determine the shunt impedance to ground which it presents to a carry propagating to line 22 on line 17. More specifically, the value of the resistor 50, in the illustrative embodiment for the adder stage $A_i$, is equal to the value of resistor 51 and is determined by the mathematical formula;

$$\text{Impedance} = 1000 \times 1.2^j \text{ ohms}$$

where $j=1$

Similarly, the resistors 52 and 53 supply control current to the switch $B_{i+1}$ and determine the shunt impedance which it presents to a carry propagating to line 39 on line 22. The values of these two resistors are again chosen to be equal and determined by the mathematical formula;

$$\text{Impedance} = 1000 \times 1.2^j \text{ ohms}$$

where $j=i+1$

In view of the foregoing it is clear that for this illustrative embodiment, a general formula for calculating the value of the resistors supplying control current to a switch $B_j$ in an adder stage $A_j$ of index $j$ is:

$$\text{Impedance} = 1000 \times 1.2^j \text{ ohms} \quad (1)$$

where $j=0, 1, 2 \ldots, N-1$ and where N is the number of stages.

Varying, according to a mathematical formula, the shunt impedance presented to the carry propagation bus by the switch in each adder stage constitutes the aforementioned impedance tapering.

The Formula 1 may be expressed more generally in the form;

$$\text{Impedance} = ZK^j$$

where Z is an impedance and K is a constant and both are parameters which are selected for the particular circuitry used in the parallel adder to minimize the loss in the carry signal when it propagates along the maximum length propagation bus. In order to select the optimum parameter values, the characteristic loss of the carry propagation bus of the adder being used is determined for a wide range of values of Z and K. From the set of characteristic loss values thus obtained, the parameter values yielding the minimum loss are selected for the final taper formula. It should be noted that this set of loss values is easily obtained by using known design aids for making a digital simulation of the adder and for varying the parameters on the simulation.

As is clear from inspection of Formula 1 for the adder of the illustrative embodiment, the adder stage of index zero uses the lowest value of shunt impedance. This value is known as the base value and is used to provide a means for comparing the results attainable using impedance tapering as opposed to constant shunt impedance at all stages. Specifically, the results attainable for an adder implemented according to applicant's invention using impedance tapering are compared with an adder using the same structure and low loss switches, but using a constant value of shunt impedance, equal to the base value defined above, for all stages. Under these conditions, the driving point impedance at all points along the carry propagation bus in applicant's adder is greater than such impedance for corresponding points along the propagation bus of the adder using the base value shunt impedance for all stages. This results in lower power dissipation for applicant's adder. In addition, the ratio of input to source impedance at all points along the propagation bus is greater for an adder according to applicant's invention than for the adder employing the constant shunt impedance for all stages. This results in a marked reduction in the voltage losses attendant to driving a finite input impedance with a nonzero source impedance. The reasons for these results will be developed more fully after the operation of the adder is thoroughly described.

For purposes of describing the operation of the illustrative adder, the following logical data inputs are assumed to be applied to the adder stages of FIG. 1:

Adder stage $A_i$;

augend $a_i$="1"; $\bar{a}_i$="0"

addend $b_i$="1"; $\bar{b}_i$="0"

Adder stage $A_{i+1}$;

augend $a_{i+1}$="1"; $\bar{a}_{i+1}$="0"

addend $b_{i+1}$="0"; $\bar{b}_{i+1}$="1"

In addition, it is assumed that the carry signal on line 17 is a "1" indicating a carry input to the adder stage $A_i$ from the adder stage $A_{i-1}$.

With these assumed inputs, the adder stage $A_i$ generates a modulo-2 sum of "1" and generates a carry that is propagated to the adder stage $A_{i+1}$. Since the two inputs $a_i$ and $b_i$ are the same, the exclusive OR function for enabling the switch $B_i$ is not satisfied and the switch $B_i$ is turned OFF preventing the propagation of the carry from the adder stage $A_{i-1}$ through the adder stage $A_i$ to the adder stage $A_{i+1}$. In addition, the adder stage $A_{i+1}$ generates a modulo-2 sum of "0" and, since the inputs $a_{i+1}$ and $b_{i+1}$ are not the same value, the exclusive OR function for enabling the switch $B_{i+1}$ is satisfied, turning the switch ON. This permits the carry generated in the adder stage $A_i$ to propagate through the adder stage $A_{i+1}$ to the adder stage $A_{i+2}$.

More specifically, the application of the carry generated by the adder stage $A_{i-1}$ on line 17 to the adder stage $A_i$ forward biases the base to emitter junction of the transistor 16 resulting in the raising of the potential developed across the resistor 15 to a level representing a logical "1" state, indicating that a carry input is being received by the adder stage $A_i$ from the adder stage $A_{i-1}$.

The "1" state potential developed across the resistor 15 in response to the "1" state potential on line 17 is applied to the carry input of the modulo-2 adder 5 in the $A_i$ adder stage. The modulo-2 adder 5 is well known in the prior art and merely determines the modulo-2 sum of two data inputs, in this case $a_i$ and $b_i$, and a carry input, in this case the carry input from the $A_{i-1}$ adder stage. An example of such a modulo-2 adder is shown in Maley and Earle, The Logic Design of Transistor Digital Computers, Prentice-Hall, pages 143–146 (1963).

As previously mentioned, inputs $a_i$ and $b_i$ are both equal to "1" and drive the modulo-2 adder 5. These inputs together with the "1" applied to carry input of the adder 5 result in a "1" being present on output 10 which indicates the appropriate modulo-2 sum of all three inputs. In addition, the "1" at input $a_i$ and the "1" at input $b_i$ enable the AND gate 6 resulting in a "1" output which is applied to the resistor 23. The "1" output of the gate 6 is also applied to the OR gate 8, resulting in a "1" being applied to the resistor 26. Simultaneously, the inputs $\bar{a}_i$ and $\bar{b}_i$, both of which are equal to "0," are applied to the AND gate 7 and inhibit its operation. When the gate 7 is inhibited, its "0" output is applied as the second input to the already enabled OR gate 8. The output of the OR gate 8 represents the logical complement of the exclusive OR of the inputs $a_i$ and $b_i$ which is defined to be the EQUIVALENCE of the inputs $a_i$ and $b_i$. When the output of the OR gate 8 is "1," the inputs $a_i$ and $b_i$ ar e both in the same logical state.

The foregoing may be generally summarized as follows. The "1" output of the OR gate 8 indicates that the EQUIVALENCE of the two inputs $a_i$ and $b_i$ is "1" and, thus, the two inputs are in the same state. This is used subsequently by the switch $B_i$ to control its switching state. In this case, the switch $B_i$ is turned OFF. Similarly, the "1" output of the AND gate 6 indicates that both of the inputs $a_i$ and $b_i$ are equal to "1." The "1" output of gate 6 is used by the switch $B_i$ to generate a carry that is propagated to the adder stage $A_{i+1}$. In summary, when the inputs $a_i$ and $b_i$ are both "1," the switch $B_i$ is turned OFF to insure that the carry on the line 17 is not propagated and the stage $A_i$, itself, generates a carry to be applied to the stage $A_{i+1}$. This will be discussed in detail later.

The switch $B_i$ responds in the following manner to the "1" output of the OR gate 8, which indicates that the inputs $a_i$ and $b_i$ are in the same logical state. The "1" is applied to the resistor 26 and results in a saturation base drive through the resistor 26 to the transistor 25. Since the transistor 25 saturates, the switch control current supplied through the resistor 50, from the potential source +V, to input 71 of the adder stage $A_i$ is bypassed through the transistor 25 to ground. Thus, the anode to anode junction of the diodes 19 and 20 is reduced to a low positive potential and the diode 19 is reverse biased by the "1" on line 17 which is the carry input from the adder stage $A_{i-1}$ that is applied to the cathode of the diode 19. Since the diode 19 is reverse biased, the carry input cannot pass through the diodes 19 and 20 to line 22.

The diodes 18 and 21, in conjunction with the diodes 19 and 20, form a well-known diode gate which is the signal switching element in the switch $B_i$. A description of a typical diode gate is contained in Millman and Taub, Pulse, Digital and Switching Waveforms, McGraw-Hill, pages 642–646 (1965). The two diodes, 18 and 21, may also provide a path between the carry input on line 17 and the line 22. However, as in the case of the diodes 19 and 20, the path through the diodes 18 and 21 is inhibited for the signals applied to the $A_i$ stage in the illustrative example. This path is inhibited since the simultaneous application of the carry on line 17 to the anode of the diode 18, the potential −V through the resistor 51 to the cathode to cathode junction of the diodes 18 and 21, and the low potential at the anode to anode junction of the diodes 19 and 20 due to the saturation of the transistor 25 all result in the diode 21 being reverse biased. Consequently, neither of the paths through the diode gate is conducting and no path exists for connecting line 17 and line 22. As a result, the "1" state on line 17 is not propagated through the switch to line 22 and the switch $B_i$ is OFF.

As discussed above, the switch $B_i$ is OFF for the assumed input conditions, $a_i$="1" and $b_i$="1." This is the usual, prior art result when the particular inputs assumed are applied to a stage of an adder using a carry propagation bus. For the adder stage $A_i$ (FIG. 1), the carry to be propagated to the adder stage $A_{i+1}$ on line 22 is referred to as $c_i$ and results from a known equation for the carry generated by a full adder stage. In this case, referring to the carry signal on line 17 from the adder stage $A_{i-1}$ as $c_{i-1}$, the Boolean equation for the carry output of the adder stage $A_i$ is;

$$c_i=(\bar{a}_ib_i+\bar{b}_ia_i)c_{i-1}+a_ib_i \quad (2)$$

which may be written as;

$$c_i=d_ic_{i-1}+a_ib_i \quad (3)$$

where $$d_i=\bar{a}_ib_i+\bar{b}_ia_i \quad (4)$$

in which the Equation 4 is easily recognizable as the exclusive OR of the augend and addend inputs, $a_i$ and $b_i$. Referring to Equation 3, it is apparent that the first term contributing to the carry $c_i$ is the AND of the exclusive OR function $d_i$ and the carry $c_{i-1}$ from the preceding stage $A_{i-1}$. This term is represented by the output to line 22 from the switch $B_i$. More specifically, since the two inputs $a_i$ and $b_i$ are both "1," the exclusive OR function $d_i$ is equal to "0" resulting in the first term of Equation 3, $d_ic_{i-1}$, being "0" and, therefore, resulting in the switch $B_i$ being OFF since the switch performs for the adder stage $A_i$ the AND of the exclusive OR function $d_i$ and the carry $c_{i-1}$ from the adder stage $A_{i-1}$.

One term in Equation 3 remains to be discussed, $a_ib_i$. This term is used to generate carry signals resulting from the augend and addend inputs to the adder stage $A_i$ with no regard to the state of the carry $c_{i-1}$ from the adder stage $A_{i-1}$. Specifically, since both $a_i$ and $b_i$ are "1," the term $a_ib_i$ is also "1" and, therefore, a carry is generated by the adder stage $A_i$ and is propagated to the adder stage $A_{i+1}$ on line 22. This generation of a carry within the stage $A_i$ is accomplished by applying the "1" output of the AND gate 6, resulting from the application of the inputs $a_i=b_i$="1" to the AND gate 6, to the resistor 23 through which base current flows to the transistor 24. Since the transistor 24 is connected as a common collector amplifier with the line 22 as its load impedance, the line 22 is raised to a potential representing a "1."

The "1" appearing on line 22 is isolated from the adder stage $A_{i-1}$ preceding the adder stage $A_i$ since the switch $B_i$ is OFF, effectively resulting in an open circuit condition between lines 17 and 22. As a result of the "1" on line 22, a carry is propagated to the adder stage $A_{i+1}$.

In exactly the same manner as described for the adder stage $A_i$, the "1" on line 22 causes the base to emitter junction of the transistor 29 of the adder stage $A_{i+1}$ to be forward biased, developing a potential representing a "1" across the resistor 30. This "1," indicating that a carry is being received from the adder stage $A_i$, is applied to the carry input of the modulo-2 adder 45. The simultaneous application of this "1" input and the inputs $a_{i+1}$="1"; $b_{i+1}$="0" to the adder 45 results in output 40 being a "0," indicating the modulo-2 sum of these three inputs. In addition, the application of the two inputs $a_{i+1}$="1" and $b_{i+1}$="0" to the AND gate 47 results in a "0" output from the gate. This "0" ouput of the AND gate 47, indicates that inputs $a_{i+1}$ and $b_{i+1}$ are not both "1," and therefore, the adder stage $A_{i+1}$ should not itself generate a carry output to the adder stage $A_{i+2}$. The output of the gate 47 is applied to the resistor 37 and to the OR gate 48. As a result of the application of the "0" output of the AND gate 47 to the resistor 37, base current does not flow through the resistor 37 to the transistor 38 and the transistor 38 remains in a nonconducting state. Thus, the potential on line 39 is not raised by the transistor 38 to a potential representing a "1" and a carry is not generated by the adder stage $A_{i+1}$.

The inputs $\bar{a}_{i+1}$="0" and $\bar{b}_{i+1}$="1" result in a "0" output from the AND gate 46 which is applied to the OR gate 48. Since both this output and the output of the gate 47 are equal to "0," the output of the OR gate 48 is equal to "0." This output from gate 48 is the result of the logical EQUIVALENCE of the inputs $a_{i+1}$ and $b_{i+1}$ and indicates that the inputs $a_{i+1}$ and $b_{i+1}$ are in different logical states. As generally indicated in discussing the Equation 3, when this condition exists, the switch $B_{i+1}$ is enabled to pass carry information from line 22 to line 39. It will be recalled that the output of the switch $B_{i+1}$ is the AND of the exclusive OR of the inputs to the adder stage $A_{i+1}$ with the carry of the preceding stage $A_i$. Here, the exclusive OR, the complement of the EQUIVALENCE, and the carry input from the stage $A_i$ are both equal to "1," indicating that a "1" carry input to the stage $A_{i+1}$ exists and conditions require that it be propagated to the next stage. Consequently, the switch $B_{i+1}$ is enabled, allowing the carry signal received from the adder stage $A_i$ to propagate through the adder stage $A_{i+1}$ to the adder stage $A_{i+2}$.

More specifically, the "0" output of the OR gate 48 is applied to the transistor 32 through the resistor 31. As a result, the transistor 32 remains in a nonconducting state and the switch control current applied through the resistor 52 from potential +V to input 73 of the adder stage $A_{i+1}$ is not bypassed to ground by the transistor 32 but is supplied to the anode to anode junction of the diodes 33 and 34.

In addition, a second control current is supplied through the resistor 53 from potential −V to the cathode to cathode junction of the diodes 35 and 36. The diodes 33, 34, 35 and 36 form a diode gate like the diode gate discussed in conjunction with the adder stage $A_i$. In this case, however, due to the positive control current supplied to the anode to anode junction of the diodes 33 and 34 and the equal negative control current supplied to the cathode to cathode junction of the diodes 35 and 36 and the fact that these control currents divide evenly between the two current flow paths, diodes 33 and 36 and diodes 34 and 35, all of the diodes are forward biased. As a result, the diode gate and, therefore, the switch $B_{i+1}$ are ON and the "1" on line 22 is passed to line 39, thus propagating the carry from the adder stage $A_i$ through the adder stage $A_{i+1}$ to the adder stage $A_{i+2}$.

From the foregoing it can be seen that each stage in the adder controls the enabling or inhibiting of its switch, as a function of its addend and augend inputs only, to pass or block the propagation to the succeeding stage of carry information from the preceding stage. If the exclusive OR of the inputs to an adder stage is "1," indicating the inputs are in different states, the switch for that stage is enabled, thus, in effect, enabling an AND gate, the other input of which is the carry signal from the preceding adder stage. On the other hand, if the inputs to an adder stage are both "1," the adder stage itself generates a carry signal to propagate to the succeeding stage.

Having discussed the operation of the two adder stages $A_i$ and $A_{i+1}$ in detail, a new set of example inputs is assumed to provide a condition that facilitates a detailed discussion of the effects of impedance tapering. For this purpose, the following inputs are assumed:

Adder stage $A_i$;

augend $a_i$="1," $\bar{a}_i$="0"
addend $b_i$="0," $\bar{b}_i$="1"

Adder stage $A_{i+1}$;

augend $a_{i+1}$="1," $\bar{a}_{i+1}$="0"
addend $b_{i+1}$="0," $\bar{b}_{i+1}$="1"

In addition, adder stage $A_{i-1}$ is assumed to apply a "1" to line 17, indicating a carry output from the adder stage $A_{i-1}$, and the switch in the adder stage $A_{i+2}$ is assumed to be OFF.

For the assumed conditions, both of the switches $B_i$ and $B_{i+1}$ are ON. As a result, the carry output on line 17 of the adder stage $A_{i-1}$ is propagated to the adder stage $A_{i+2}$ over the carry propagation bus consisting of the line segments 17, 22, and 39, interconnected by the switches $B_i$ and $B_{i+1}$. The carry on line 17 encounters various distributed and lumped impedances in propagating along this propagation bus and through the switches $B_i$ and $B_{i+1}$ to the adder stage $A_{i+2}$.

It will be recalled that the value of the control current resistors for a stage is determined in accordance with a mathematical formula dependent on the identification index of the stage. Specifically, the resistors 50 and 51 are both equal and of a value determined by the equation $$\text{Impedance} = 1000 \times 1.2^{i} \text{ ohms}$$

since the identification index for the adder stage $A_i$ is *i*. These two resistors in parallel determine the shunt impedance presented by the adder stage $A_i$, and more specifically, the switch $B_i$, to the carry propagation bus. Similarly, the resistors 52 and 53 are equal and of a value determined by the equation $$\text{Impedance} = 1000 \times 1.2^{i+1} \text{ ohms}$$

since the identification index of the adder stage $A_{i+1}$ is $i+1$. These two resistors in parallel determine the shunt impedance presented by the switch $B_{i+1}$ in the adder stage $A_{i+1}$ to the carry propagation bus. This shunt impedance for the switch $B_{i+1}$ is higher than the shunt impedance for the switch $B_i$.

As previously mentioned, where both of the switches $B_i$ and $B_{i+1}$ are enabled, the carry propagation bus consists of the series connection of lines 17, 22 and 39, the shunt connection of the parallel combination of the resistors 50 and 51, which shall be referred to as impedance R, and the parallel combination of the resistors 52 and 53, which shall be referred to as impedance $R^1$.

In order to determine the effects of impedance tapering on the propagation bus of applicant's adder in comparison with a nontapered propagation bus, assume an adder precisely the same as that shown in FIG. 1 wherein the resistors 50, 51, 52, and 53 are all the same value and assume that value to be twice the value R. This adder will be called the nontapered adder and, with the same inputs, its propagation bus consists of the same elements as the bus in applicant's adder except that the switch shunt impedances are both equal to R rather than R and $R^1$, respectively. On this assumption, two basic improvements resulting from impedance tapering are discernible. First, the driving point impedance of the propagation bus at the point of application of the carry for the adder stage $A_{i-1}$ is higher for applicant's adder than for the nontapered adder. This results from the fact that the driving point impedance of the applicant's adder, determined by the parallel combination of the impedance R and the impedance $R^1$, which is greater than R, is larger than the driving point impedance of the nontapered adder determined by the parallel combination of two impedances of value R. This higher driving point impedance results in a smaller driving current requirement and in less power dissipation.

Secondly, and more importantly, the ratio of input impedance to source impedance, at any point on line 22 is higher for applicant's adder than for the nontapered adder, assuming that the impedance R is at least ten times the driving source impedance of the adder stage $A_{i-1}$. This follows from the fact that, under these conditions, the source impedance along the line will be controlled by the source impedance of the adder stage $A_{i-1}$ and therefore a higher input impedance will result in a higher input to source impedance ratio. Clearly, since the impedance $R^1$ is greater than the impedance R, the input impedance and, therefore, the input impedance to source impedance ratio for applicant's adder will be greater than for the nontapered adder. As a result, the voltage division ratio for signals appearing at the adder stage $A_{i+1}$ is greater in applicant's adder than in the nontapered adder and, therefore, less of the signal voltage will be dropped across the source impedance. This effect becomes more pronounced by the addition of more stages and, therefore, more parallel impedances to the propagation bus.

In summary, the foregoing has shown that applicant's invention improves the performance of a multistage carry propagation bus adder by selecting, according to a mathematical formula which is a function of an identification index associated with each stage, the shunt impedance which each stage of the adder presents to the carry propagation bus. Implementing such an adder in this manner provides a bus in which carry signal degradation is minimized when a carry is propagated on the bus.

While the illustrative embodiment consists of a four-stage parallel binary adder, it is clear that applicant's invention is useful in implementing any parallel N stage digital adder. In addition, while applicant's illustrative embodiment has shown the use of impedance tapering wherein only resistors were varied, impedance tapering in which energy storage elements are also tapered at each adder stage is clearly within the scope of applicant's invention.

What is claimed is:

1. In a multistage, parallel adder;
- a first adder stage $i-1$ responsive to selected input signals for generating a carry signal at the carry signal output terminal of said adder stage $i-1$; and
- a second adder stage $i$ including means responsive to selected input signals for connecting said carry signal output terminal of said first adder stage $i-1$ to an impedance related to the variable $i$.

2. In a multistage, parallel adder; an adder stage comprising:
- a carry signal input terminal;
- impedance means having a value related to the numerical significance of said adder stage in said parallel adder; and
- switching means responsive to selected input signals for connecting said carry signal input terminal of said adder stage to said impedance means.

3. In a multistage, parallel adder, an adder stage comprising:

- a first propagation bus section;
- a second propagation bus section;
- means responsive to selected input signals for generating a control signal; and
- switching means responsive to said control signal for connecting said first propagation bus section to said second propagation bus section and to a shunt impedance related to the numerical significance of said adder stage in said parallel adder.

4. In an N stage, parallel adder wherein the adder stages are each assigned an index $j$ taking on values from zero, for the least significant stage, to N—1 for the most significant stage, an adder stage $i$ comprising:
- a first carry propagation bus section;
- a second carry propagation bus section; and
- switching means responsive to selected input signals for connecting said first carry propagation bus section to said second carry propagation bus section and to a shunt impedance determined by the equation $$\text{Impedance}=ZK^j$$

where Z is an impedance, K is a constant and $j=i$ is the adder stage index.

5. The parallel adder of claim 4 wherein said switching means comprises:
- means responsive to said selected input signals for generating a control signal; and
- means responsive to said control signal for connecting said first carry propagation bus section to said second carry propagation bus section and to said shunt impedance.

6. In the adder of claim 4, said switching means comprising:
- a diode gate with an input connected to said first carry propagation bus section and an output conected to said second carry propagation bus section, a positive control current input and a negative control current input; and
- means responsive to said selected input signals for shunting the positive control current input to ground to inhibit signal passage from said first carry propagation bus section to said second carry propagation bus section; and
- said shunt impedance comprising:
  - a resistor connected from a positive potential to said positive control current input, the value of which resistor is determined by the equation $$\text{Impedance}=R\times K^j$$

where $j=i$, R is a resistance and K is a constant;
  - a resistor connected from a negative potential to said negative control current input, the value of which resistor is determined by the equation $$\text{Impedance}=R\times K^j$$

7. In an N stage, binary, parallel adder wherein the stages are assigned an integer index $j$ taking on values from zero, for the least significant stage, to N—1, for the most significant stage:
- an adder stage $i-1$ for generating a carry signal in response to selected input signals;
- an adder stage $i$ including a switching means responsive to selected input signals for connecting the carry signal input terminal and the carry signal output terminal of said adder stage $i$ to a shunt impedance determined by the equation $$\text{Impedance}=ZK^j$$

where Z is an impedance, K is a constant and $j=i$, the index of said adder stage $i$; and means for connecting said carry signal to said carry signal input terminal.

References Cited

UNITED STATES PATENTS

| | | | |
|---|---|---|---|
| 3,053,452 | 9/1962 | Kilburn et al. | 235—175 |
| 3,612,847 | 10/1971 | Jorgensen | 235—175 |
| 3,371,195 | 2/1968 | Bolt et al. | 235—175 |
| 3,553,446 | 1/1971 | Kruy | 235—175 |
| 3,366,804 | 1/1968 | Heaviside | 307—257 |
| 3,597,633 | 8/1971 | Hirano et al. | 307—257 |

OTHER REFERENCES

Weller, "A High Speed Circuit for Binary Adders," IEEE Trans. on Computers, vol. C–18, No. 8, August 1969, pp. 728–732.

MALCOLM A. MORRISON, Primary Examiner

J. F. GOTTMAN, Assistant Examiner

U.S. Cl. X.R.

235—173